(12) United States Patent
Griffith, Jr. et al.

(10) Patent No.: US 10,093,538 B2
(45) Date of Patent: Oct. 9, 2018

(54) HEATER ASSEMBLY, HYDROGEN GENERATOR AND METHOD OF PROVIDING HYDROGEN GAS

(71) Applicant: Intelligent Energy Inc., San Jose, CA (US)

(72) Inventors: Paul D. Griffith, Jr., North Olmsted, OH (US); Craig R. Huddleston, Lakewood, OH (US); Chad E. Law, Milan, OH (US); Mark D. Vandayburg, Westlake, OH (US)

(73) Assignee: INTELLIGENT ENERGY INC., San Jose, CA (US)

( * ) Notice: Subject to any disclaimer, the term of this patent is extended or adjusted under 35 U.S.C. 154(b) by 586 days.

(21) Appl. No.: 14/716,021

(22) Filed: May 19, 2015

(65) Prior Publication Data

US 2015/0255816 A1    Sep. 10, 2015

Related U.S. Application Data

(63) Continuation of application No. PCT/US2013/021538, filed on Jan. 15, 2013, which
(Continued)

(51) Int. Cl.
*H01M 8/06* (2016.01)
*C01B 3/00* (2006.01)
(Continued)

(52) U.S. Cl.
CPC .............. *C01B 3/00* (2013.01); *C01B 3/0015* (2013.01); *C01B 3/0021* (2013.01);
(Continued)

(58) Field of Classification Search
CPC ............. H01M 8/065; H01M 8/04208; H01M 8/04216; H01M 8/04201; C01B 3/065; Y02E 60/362; F17C 11/005
See application file for complete search history.

(56) References Cited

U.S. PATENT DOCUMENTS 5,262,619 A    11/1993    Karner et al.
6,091,050 A    7/2000    Carr
(Continued)

FOREIGN PATENT DOCUMENTS

CN    1476648 A    2/2004
CN    1481275 A    3/2004
(Continued)

OTHER PUBLICATIONS

International Patent Application No. PCT/US2013/021538; Int'l Preliminary Report on Patentability; dated May 28, 2015; 8 pages.
(Continued)

*Primary Examiner* — Imran Akram
(74) *Attorney, Agent, or Firm* — Baker & Hostetler LLP

(57) ABSTRACT

A heater assembly for use in a hydrogen generator can be retracted to facilitate insertion and removal of a replaceable fuel unit without damaging the heater assembly or the fuel unit and extended to provide good thermal contact with the fuel unit during use of the hydrogen generator. The heater assembly includes a support member, a heater, and an actuator for extending and retracting the heater assembly. When the heater is energized it heats the actuator, thereby extending the heater assembly to contact the adjacent fuel unit, and when the heater is deenergized the actuator cools to retract the heater assembly and provide a gap between the heater assembly and the adjacent fuel unit. The actuator is movably secured to the heater or the support member by a retainer such that an end of the actuator is movable within the retainer as the actuator changes shape during heating and cooling.

15 Claims, 10 Drawing Sheets

Related U.S. Application Data is a continuation of application No. 13/680,647, filed on Nov. 19, 2012.

(51) Int. Cl.
    *B01J 19/24* (2006.01)
    *H01M 8/04082* (2016.01)
    *C01B 3/04* (2006.01)
    *C01B 3/06* (2006.01)
    *H01M 8/04007* (2016.01)

(52) U.S. Cl.
    CPC .......... *C01B 3/0026* (2013.01); *C01B 3/0031* (2013.01); *C01B 3/0057* (2013.01); *C01B 3/04* (2013.01); *C01B 3/065* (2013.01); *H01M 8/04037* (2013.01); *H01M 8/04208* (2013.01); *B01J 2219/00135* (2013.01); *Y02E 60/325* (2013.01); *Y02E 60/327* (2013.01); *Y02E 60/328* (2013.01); *Y02E 60/362* (2013.01); *Y02E 60/364* (2013.01)

(56) References Cited

U.S. PATENT DOCUMENTS

| | | |
|---|---|---|
| 9,243,560 B2 | 1/2016 | Law et al. |
| 2002/0073617 A1 | 6/2002 | Ovshinsky et al. |
| 2004/0076861 A1 | 4/2004 | Mann et al. |
| 2004/0214056 A1 | 10/2004 | Gore |
| 2005/0074643 A1 | 4/2005 | Adams et al. |
| 2005/0244683 A1 | 11/2005 | Otis et al. |
| 2006/0174952 A1 | 8/2006 | Curello et al. |
| 2008/0026269 A1 | 1/2008 | Shurtleff et al. |
| 2008/0286621 A1 | 11/2008 | Rosenzweig et al. |
| 2009/0060833 A1 | 3/2009 | Curello et al. |
| 2009/0324452 A1 | 12/2009 | Salinas et al. |
| 2010/0012219 A1 | 1/2010 | Shibukawa |
| 2010/0104481 A1 | 4/2010 | Curello et al. |
| 2011/0176973 A1 | 7/2011 | Rosenzweig et al. |
| 2011/0212374 A1 | 9/2011 | Rosenzweig et al. |
| 2012/0115054 A1 | 5/2012 | Wallace et al. |
| 2013/0108940 A1 | 5/2013 | Langan et al. |
| 2014/0137562 A1* | 5/2014 | Law .................. C01B 3/04 60/772 |
| 2014/0140919 A1 | 5/2014 | Langan |

FOREIGN PATENT DOCUMENTS

| | | |
|---|---|---|
| CN | 101627250 A | 1/2010 |
| CN | 102006936 A | 4/2011 |
| EP | 1434296 A1 | 6/2004 |
| EP | 1571124 A1 | 9/2005 |
| EP | 2429257 | 3/2012 |
| JP | 2008-215366 A | 9/2008 |
| WO | WO 2014/077868 | 5/2014 |

OTHER PUBLICATIONS

International Patent Application No. PCT/US2013/054918; Int'l Preliminary Report on Patentability; dated May 28, 2015; 7 pages.
International Search Report dated Aug. 7, 2013, issued in International patent application PCT/US2013/021538 filed Apr. 11, 2014.

* cited by examiner

HEATER ASSEMBLY, HYDROGEN GENERATOR AND METHOD OF PROVIDING HYDROGEN GAS

CROSS-REFERENCE TO RELATED APPLICATIONS

This patent application is a Continuation of international patent application PCT/US2013/021538 filed Jan. 15, 2013, which claims priority to Non-Provisional patent application Ser. No. 13/680,647 filed Nov. 19, 2012, the disclosures of which are incorporated by reference in their entirety.

TECHNICAL FIELD

This invention relates to a heater assembly, a hydrogen generator for providing hydrogen gas including the heater assembly, and a method of operating the hydrogen generator to provide the hydrogen gas.

BACKGROUND

Interest in fuel cell batteries as power sources for portable electronic devices has grown. A fuel cell is an electrochemical cell that uses materials from outside the cell as the active materials for the positive and negative electrode. Because a fuel cell does not have to contain all of the active materials used to generate electricity, the fuel cell can be made with a small volume relative to the amount of electrical energy produced compared to other types of batteries.

In some types of hydrogen fuel cells, hydrogen is formed from a hydrogen-containing fuel supplied to the negative electrode side of the fuel cell. In other types of hydrogen fuel cells, hydrogen gas is supplied to the fuel cell from a source outside the fuel cell.

A fuel cell system can include a fuel cell battery, including one or more fuel cells (e.g., a fuel cell stack), and a fuel source, such as a fuel tank or a hydrogen generator. Hydrogen generators that supply hydrogen gas to a fuel cell can be an integral part of a fuel cell system, or they can be removably coupled to the fuel cell system. A removable hydrogen generator can be replaced with another one when the hydrogen containing materials have been consumed. Removable hydrogen generators can be disposable (intended for only a one-time use). Both removable and permanently installed hydrogen generators can be refillable (intended for use multiple times) to replace consumed fuel composition.

Hydrogen generators can produce hydrogen using a variety of hydrogen containing materials and a variety of methods for initiating the hydrogen generating reactants. Hydrogen gas can be released when a hydrogen containing material is heated.

In selecting hydrogen containing materials for use in a hydrogen generator, consideration may be given to the following: (a) stability during long periods of time when the hydrogen generator is not in use, (b) ease of initiation of a release of hydrogen gas, (c) the amount of energy that must be provided to sustain the release of hydrogen gas, (d) the maximum operating temperature of the release of hydrogen gas, and (e) the total volume of hydrogen that can be produced per unit of volume and per unit of mass of the hydrogen containing material(s).

Some hydrogen containing compounds can be heated to release hydrogen gas, such as in a chemical decomposition reaction. Reactants that can undergo thermal decomposition reactions to produce hydrogen gas are desirable because they generally produce a relatively high volume of hydrogen gas on a volumetric basis.

One problem with conventional hydrogen generators is that heat transfer from the heater to the fuel is inefficient. Another problem with conventional hydrogen generators is difficulty in loading and unloading fuel units and replacing spent fuel units without damaging the hydrogen generator or the fuel unit.

SUMMARY

The above objects are met and the above disadvantages of the prior art are overcome by the invention, which includes a heater assembly with a heater that can be extended to make good physical contact to efficiently conduct heat to an object to be heated and retracted out of contact when heating is not required.

Accordingly, one aspect of the present invention is a heater assembly for a hydrogen generator. The heater assembly includes a support member, a heater, and an actuator for extending and retracting a heater assembly heating surface away from and toward the support member, respectively. The actuator and the heater assembly are in a retracted state when the actuator is at or below a first prescribed temperature and in an extended state when the actuator is at or above a higher second prescribed temperature. The heating surface is disposed closer to the support member when the heater assembly is in the retracted state than when the heater assembly is in the extended state. Embodiments of the heater assembly can include one or more of the following features:
   the actuator is movable from the retracted state to the extended state when an actuator temperature increases to at least the second prescribed temperature, and the actuator is movable from the extended state to the retracted state when an actuator temperature decreases to or below the first prescribed temperature; the actuator can be a bimetal actuator, the first prescribed temperature can be 200 degrees Celsius, and the second prescribed temperature can be 250 degrees Celsius;
   the heater assembly includes a plurality of the actuators and a plurality of the heaters;
   the heater is an electric heater;
   the heater includes a heating element disposed on a heater substrate; the substrate can have a thermal conductivity of less than 1 watt/meter·Kelvin; the heating element can be an electrical circuit printed on the substrate; the heating element can be embedded in the substrate
   the heater assembly further includes a retainer that movably secures the actuator to one of the heater and the support member such that an end of the actuator is movable within the retainer; the end of the actuator can be slidable within the retainer;
   the actuator has opposite ends; each of the opposite ends of the actuator can be movably secured to the heater by one or more retainers; the actuator can be secured between the opposite ends to the support member; the actuator assembly can include two actuators, each disposed on an opposite side of the support member; each of the actuators can be secured between their opposite ends to the other actuator, through an aperture in the support member;
   the heater assembly includes a thermally conductive plate that includes the heating surface; the actuator can be disposed on a first side of the heater with the thermally conductive plate disposed on an opposite second side of the heater, the support member can be disposed on a first side of the heater with the actuator disposed on an opposite second side of the heater, between the heater and the thermally conductive plate; the thermally conductive plate includes an integral retainer that moveably secures the end of the actuator to the heater; and the support member includes an integral retainer for movably securing the end of the actuator to the support member.

A second aspect of the invention is a hydrogen generator. The hydrogen generator includes a housing, a heater assembly according to any of the embodiments described above for heating a hydrogen containing material to release hydrogen, and a replaceable fuel cartridge containing the hydrogen containing material. When the heater assembly actuator is in the extended state, the heater assembly is in contact with the fuel unit, and when the actuator is in the retracted state, a gap is present between the heater assembly and the fuel unit. Embodiments of the hydrogen generator can include one or more of the following features:

the hydrogen generator includes a plurality of the heater assemblies;

the hydrogen generator includes a plurality of the fuel units; and the housing includes a plurality of walls; a wall of the housing can include a panel that can be opened to insert and remove the fuel unit; the hydrogen generator can include an interlock to prevent opening of the panel when the heater assembly is in contact with the fuel cartridge; the heater assembly support member can be secured to a wall of the housing; the support member can include a portion of a wall of the housing; the support member can extend from a wall of the housing into a cavity in the housing in which one or more fuel cartridges can be removably disposed.

A third aspect of the invention is a method of operating a hydrogen generator according to any of the embodiments described above to provide hydrogen gas, the method including the steps: (a) receiving the fuel unit in the hydrogen generator housing, (b) providing electrical energy to the heater to produce heat, (c) heating the actuator with the heat produced by the heater to increase the actuator temperature to at least the second prescribed temperature, thereby extending the actuator and the heater assembly so the heater assembly contacts the fuel unit, (d) continuing to provide electrical energy to the heater to produce heat that is conducted into the fuel unit to heat the hydrogen containing material to release hydrogen gas, (e) ceasing to provide electrical energy to the heater, (f) allowing the heater and the actuator to cool to decrease the actuator temperature to or below the first prescribed temperature, thereby retracting the actuator and the heater assembly to create the gap between the heater assembly and the fuel unit, and (g) removing the fuel unit from the housing.

These and other features, advantages and objects of the present invention will be further understood and appreciated by those skilled in the art by reference to the following specification, claims and appended drawings.

Unless otherwise specified herein, all disclosed characteristics and ranges are as determined at room temperature (20-25° C.).

DESCRIPTION

Figure 1:
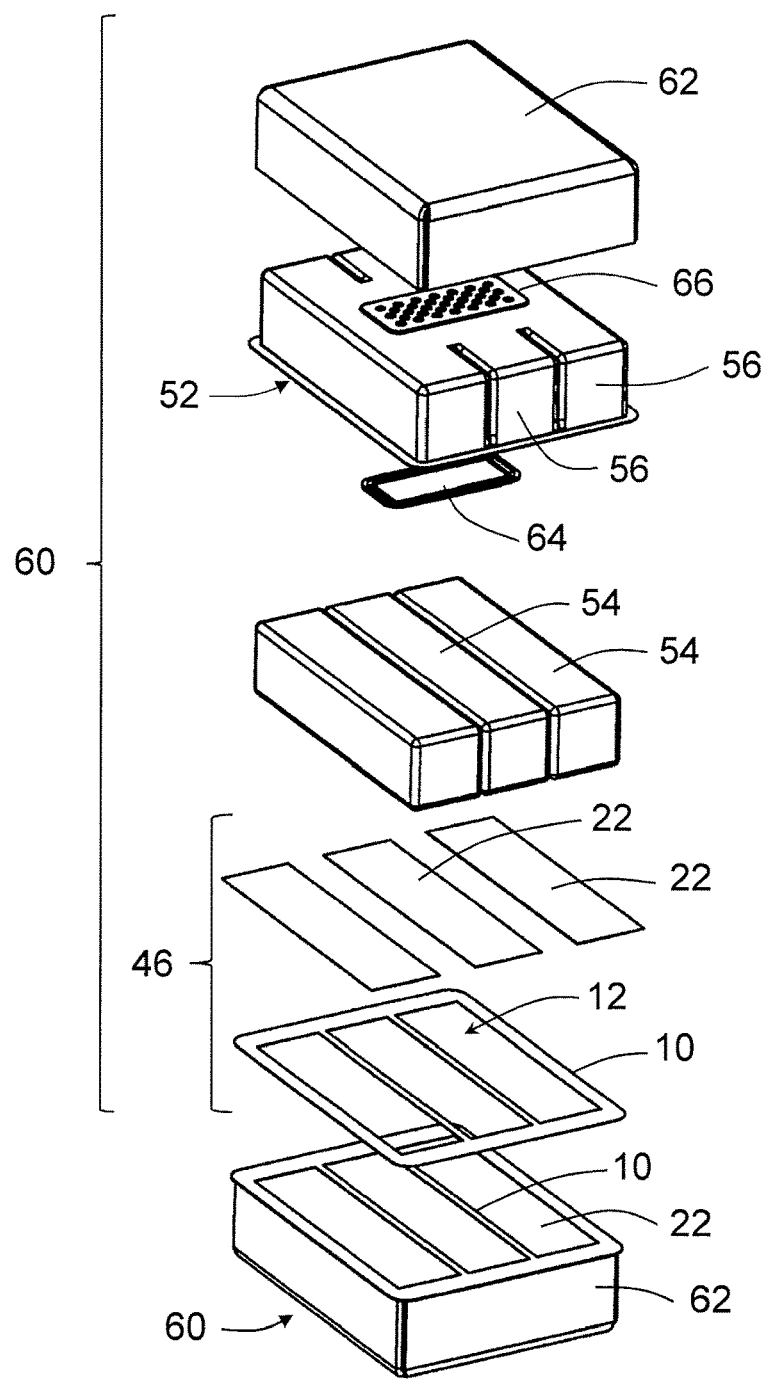
FIG. 1 is a partially exploded perspective view of two fuel unit packages.

A heater assembly according to the invention includes a support member configured to support at least one heater and at least one actuator for extending and retracting the heater assembly. When the actuator is at a low temperature (a first prescribed temperature) the actuator and the heater assembly are in a retracted state, and when the actuator is at a high temperature (second prescribed temperature) the actuator and the heater assembly are in an extended state. When the heater assembly is in the extended state, a heating surface is extended away from the support member, and when the heater assembly is in the retracted state the heating surface is retracted toward the support member. When the heater is retracted, more space is available between the heater assembly and the object to be heated (e.g., a hydrogen generator fuel unit), allowing the object to be placed into and removed from a position adjacent to the heater assembly without the object coming in contact with the heater assembly. When the heater is extended, the heater assembly heating surface is in contact with the object in order to provide good thermal contact for efficient heating of the object. When the heater is energized and begins producing heat, heat is conducted from the heater to the actuator, thereby heating the actuator. When the actuator temperature increases to at least the second prescribed temperature, the actuator shape changes, and the actuator moves from the retracted state to the extended state to move the heating surface into contact with the adjacent object. When it is no longer desired to heat the object, the heater is deenergized, and both the heater and the actuator begin to cool. When the actuator temperature decreases to or below the first prescribed temperature, the actuator shape changes shape, and the actuator moves from the extended state to the retracted state to move the heating surface away from the adjacent object and create a gap between the heater assembly and the object. In this way there is good contact between the heater assembly heating surface and the object to efficient conduct heat to the object when desired, yet a gap is present between the heater assembly and the object when heating is not desired, so the object can be moved into and out of proximity to the heater assembly without damaging either.

The heater assembly includes one or more heaters for converting electric energy to thermal energy. Electric energy can be provided from an external source such as a primary battery, a secondary battery, a fuel cell battery, a capacitor, a public utility and combinations thereof. The heater assembly can include more than heater and/or more than one actuator. As described below, each actuator is heated by a single heater, but it will be appreciated that one or more actuators can be heated by a single heater, or a single actuator can be heated by more than one heater. Individual heaters or groups of heaters in a heater assembly can be selectively energized, as described in further detail below.

The components of the heater assembly can be arranged in various ways. Either the actuator or the heater can be disposed against the support member, with the heating surface on the opposite side of the actuator and heater from the support member.

The support member is made from a material with adequate strength and stability over the temperature range to which it is expected to be exposed. It will preferably be electrically and thermally nonconductive to minimize conductive heat loss from the heater assembly during operation. The support member will preferably be as small and thin as practical. Examples of materials that may be suitable include low conductivity stainless steel, high temperature circuit board materials, sheet molding compounds, polyetheretherketone (PEEK), polyimide, mica and ceramics. If the support member is made from a conductive material, an additional layer of insulating material such as a meta-aramid, polyimide, or PEEK is preferred.

The heater can be an electric heater, such as a heater including a resistive material such as a metal or an alloy such nickel-chromium, iron-chromium-aluminum and copper-nickel for example. An exemplary heater is a thin profile heater. Such a heater can include a heater substrate. If the support member is a relatively good thermal conductor, the heater substrate is preferably made of a material that is a poor thermal conductor (e.g., with a thermal conductivity less than 10 watt/meter·Kelvin and preferably less than 1 watt/meter·Kelvin), such as mica. The substrate can have a resistive material applied to or embedded in the heater substrate by any suitable method (e.g., by printing, by securing with a fastener or adhesive, or by pressure laminating). A thin and/or thermally conductive protective coating can be applied, secured or otherwise disposed over the resitive material and the surface of the substrate. Electrical contacts can also be provided on the heater substrate for making electrical contact with the energy source.

The actuator is made with a material that will change its shape when heated and cooled. The shape change can be the result of bending, shortening and elongating, or becoming thicker (less dense) and thinner (more dense) for example. The actuator may go through a transitional state, between its retracted and extended state, in which the actuator is neither fully retracted nor fully extended, e.g., when its temperature is between the first and second prescribed temperatures. Alternatively, the change between first and second states can be essentially immediate (i.e., no more than about 5 seconds) (e.g., snap action), with the first and second prescribed temperatures being very close or essentially equal.

An exemplary actuator is a multi-metal actuator such as a bimetallic element. A bimetallic element is a device formed of two metals that are bonded together, each having a different coefficient of thermal expansion. A bimetallic element is used to convert a temperature change into mechanical displacement. In particular, the actuator is in a retracted state when a temperature of the actuator is at or below a first prescribed temperature and the actuator is in an extended state when a temperature of the actuator is at or above a second prescribed temperature. A bimetallic actuator can also provide an efficient and reliable means of conducting heat, so it can be positioned between the heater and the heating surface (e.g., a thermally conductive plate) of the heater assembly. In an embodiment of a bimetallic element the first prescribed temperature is 200 degrees Celsius. The second prescribed temperature can be 250 degrees Celsius.

Another exemplary actuator is a layer of plaque made up of from a positive temperature coefficient (PTC) composition that includes a carbon and polymer blend, may be used to join the heater(s) to the fuel unit. The PTC composition expands during heating. The layer of plaque is used to join the heaters to the conductor sections when the fuel unit is inserted in the cavity and the layer of plaque is heated to a temperature sufficient to activate the PTC composition. This type of actuator may not be as good of a thermal conductor as other types, and may be better suited for applications in which the actuator is disposed between the support member and the heater.

The heating surface is the surface of the heater assembly that contacts the object to be heated. The heating surface can be a surface of the heater if the actuator is disposed between the heater and the support member, the heating surface can be a surface of the actuator if the heater is disposed between the actuator and the support member, or the heating surface can be a separate thermally conductive plate in contact with either the heater or the actuator. The thermally conductive plate can provide protection against damage to the remainder of the heater assembly. The thermally conductive plate can be made from a material such as a metal or metal alloy or another material with good thermal conductivity.

The retainer can be any structure that will hold an end of the actuator against the heater (to allow efficient heating of the actuator) or the support member, yet allow the end or actuator to move (e.g., by sliding), thereby allowing the shape of the actuator to change as its temperature changes, without loss of contact or damage. One or more retainers can be used to secure an end of the actuator to the heater or support member. More than one end of the actuator, preferably opposite ends, can be held against the heater or support member in this manner by one or more retainers. In some embodiments one or more retainers are a part of the support member, the heater, the actuator or the thermally conductive plate. In other embodiments one or more retainers are separate components. The retainer will have sufficient strength and stability to withstand the temperature changes that occur during use of the heater assembly. The retainer is preferably made of a metal that will retain its formed shape during use of the heater assembly.

One or more heaters can be disposed on a single side of the support member, or heaters can be disposed on opposite sides of the support member. When one or more heaters are disposed on a single side, either the actuator or the heater must be secured to the support member, depending on which of the actuator and the heater is adjacent to the support member. When heaters are disposed on opposite sides of the support member, actuators or heaters can be secured to the adjacent support member, or they can be secured to corresponding actuators or heaters on the opposite side of the support member, such as through aperture in the support member.

A hydrogen gas generator including the heater assembly is particularly well suited for receiving a fuel unit package containing a fuel that releases hydrogen gas when heated. With the actuator in the retracted position, damage to the heater assembly and fuel unit can be avoided during insertion and removal of the fuel unit.

The fuel unit can include a package containing a fuel composition. The packaged fuel unit can be removably inserted into a hydrogen gas generator that can be used to provide hydrogen gas to a device, such as a fuel cell battery or other hydrogen consuming device or appliance. The fuel composition is enclosed within the package and includes one or more hydrogen containing materials that can release hydrogen gas when heated to at least a minimum temperature. Heat from the heater assembly is conducted through the package to initiate the release of hydrogen gas from the fuel composition, as described below.

An example of a suitable fuel unit package and a method of making it are disclosed in U.S. Provisional Application No. 61/657,909, entitled "Method of Making a Packaged Fuel Unit for a Hydrogen Generator, filed Jun. 11, 2012. This package includes a plurality of thermally conductive sections in a package wall that is otherwise a relatively poor thermal conductor. The thermal conductor sections are in thermal communication with a plurality of segregated quantities of fuel composition, such that the release of hydrogen gas can be selectively initiated in individual segregated quantities, each providing a limited amount of hydrogen gas. In the assembled fuel unit, the conductor sections in the package are disposed to conduct heat from an external heater through the package. Each conductor section can conduct heat from a separate heater through the package, or heat from more than one heater can be conducted through a single conductor section.

The fuel composition includes one or more hydrogen containing materials that can release hydrogen gas when heated. Preferred materials do not require costly catalysts to undergo hydrogen-generating reactions. Examples of hydrogen containing materials that may be suitable include materials that can reversibly absorb and desorb hydrogen (e.g., metal-organic frameworks (MOFs), zeolites, graphene, carbon nanotubes and metal hydrides as AB5 and AB2 type hydrogen storage alloys such as titanium-manganese, mischmetal-nickel, lanthanum-nickel-cobalt and lanthanum-nickel alloys), materials that can react to produce hydrogen gas upon thermal decomposition (e.g., metal hydrides such as lithium hydride, magnesium hydride, and aluminum hydride (alane), complex hydrides and their ammonia adducts such as lithium borohydride, sodium borohydride, magnesium borohydride, calcium borohydride, ammine titanium (III) borohydride, lithium aluminum hydride, sodium aluminum hydride, lithium amide, and calcium aluminum hydride, and B—N chemical hydrides such ammonia borane and hydrazine borane), and various combinations including the above materials. Choices of materials may be limited by other factors such as physical and chemical properties of the material, the type and location of heater(s), the temperature range for the desired release of hydrogen gas, whether the hydrogen release is exothermic or endothermic, the composition, form and properties of byproducts, and so on.

The fuel composition can also contain one or more additives. Examples of additives include binders (e.g., acrylates and styrene block copolymers), stabilizing compounds (e.g., solid bases), thermally conductive materials (e.g., metals, graphites and combinations and composites thereof), ignition materials as described below, thermally conductive coatings or layers, thermally insulating coatings or layers, and so on. Preferably catalysts are not included in the fuel composition.

It may be desirable to include an ignition material in the fuel unit, especially if the release of hydrogen gas is endothermic. An ignition material reacts exothermically when heated and can be used in conjunction with the initiation system to provide heat to initiate the release of hydrogen gas from the hydrogen containing material. An ignition material can provide a number of advantages. The temperature to which the ignition material must be heated to react may be lower than the minimum temperature to which the hydrogen containing material must be heated, reducing the heat producing requirement for the initiation system. Because the ignition material reacts exothermically, it can reduce the total amount of energy that must be supplied to the heater(s) during use of the fuel unit, particularly if the release of hydrogen gas by the hydrogen containing material is endothermic. An ignition material can be disposed within or in contact with the fuel composition. For example, the ignition material can be an ingredient of the fuel composition, the ignition material can be a separate layer of the fuel composition from the portion containing the hydrogen containing material, or ignition material can be in a separate pellet in thermal communication with the fuel composition. When an ignition material is separate from the hydrogen containing material, portions containing ignition material can be alternated with portions containing hydrogen containing material. For example, each portion containing hydrogen containing material can have an adjacent portion of ignition material; a portion containing ignition material can be disposed adjacent to multiple portions of fuel composition. If desired, ignition material can be proximate a surface of the fuel unit to facilitate initiation by the heater assembly. A portion of ignition material can extend away from the point of initiation to facilitate heating fuel composition in more remote portions of the fuel unit. In some embodiments, both the portion of the fuel unit containing hydrogen containing material and the portion containing ignition material contain both hydrogen containing and ignition materials, but in different proportions. Some types of ignition materials will also generate hydrogen gas when they react, contributing to the total amount of hydrogen the fuel unit can provide. Examples of ignition materials include metal/metal oxide multilayers such as $Ti/Pb_3O_4$, $Zr/Fe_2O_3$, guanidinium borohydride, B—N compounds blended with oxidizers such as ammonium nitrate or $Sr(NO_3)_2$ as described in US2011/0027168A1, metal/metal multilayered thin films and structures such as Ni/Al as described in U.S. Pat. No. 7,867,441, autoignition compositions such as silver nitrate mixed with potassium nitrate and molybdenum metal as described in U.S. Pat. No. 6,749,702, complex hydride, oxidizer, and S compositions such as described in US7964111, and the compositions described in patents US2008/0236032A1 and US 2008/0241613A1. Other compositions include gels of metals and water such as Mg/water/poly(acrylamide-co-acrylic acid) alone or in combination with sodium borohydride (Varma, et al. Chem. Eng. Sci. 2010, 65, 80-87 and Int. J. Hydrogen En 2007, 32, 207-211, respectively). It will be understood that references herein to initiating a release of hydrogen gas from a hydrogen containing material includes initiating a heat generating reaction in an ignition material in embodiments in which the fuel unit includes an ignition material.

The fuel composition is preferably a high density solid, such as in powdered or granular form (e.g., contained in one or more compartments), or formed into solid bodies such as pellets, pills, tablets, wafers or cakes, e.g., by compressing, molding extruding depositing, coating roll coating, printing, and so on. The fuel composition can be in contained within one or more receptacles or formed on a substrate with the fuel unit. Each fuel unit can have a single quantity of fuel composition, or the fuel composition can be disposed in one or more segregated quantities. Quantities of fuel composition can be sized and shaped to produce a desired amount of hydrogen gas, fit within the fuel unit in a volume efficient manner, facilitate initiation (heating), prevent cross-initiation of adjacent quantities, facilitate release of generated hydrogen, and so on.

Segregated quantities of fuel composition can be separated from one another in various ways, such as by containment in individual compartments and/or being spaced apart by gaps, coatings, thermal insulation and the like. If the fuel composition is contained in one or more compartments, the compartments may be covered with a covering layer to retain the material in the desired compartments. The compartments and the covers can be part of the fuel unit package.

A fuel unit package can contain the fuel composition as well as non-gaseous byproducts. The package will have sufficient strength and chemical and thermal stability to do so during shipping, during storage and handling prior to use, during use, and during removal and subsequent handling. The package can be made from a variety of materials, such as metal foil, polymer film, laminates such as metal/plastic laminates, and cast or molded casings. Examples of metal/plastic laminates include metals such as aluminum, nickel, copper and steel and polymers such as polyesters, nylons, polypropylene and polyethylene. High temperature plastics and thermosets can be used to cast or mold casings; examples include polyimides such as KAPTON® (from DuPont) and polyether ether ketone (PEEK) polymers. The package can be closed by any suitable method or methods, such as by folding and/or overlapping, mechanically closing, sealing (e.g., with an adhesive, heat seal, ultrasonics) and so on. It may also be desirable for the package to remain sealed except to release hydrogen as needed. This can require sealing the package, the use of a hydrogen outlet valve and/or the capability of containing at least some internal pressure for example. Scaling the package can protect the contents from exposure to the environment (e.g., from oxygen and moisture), contain small quantities of hydrogen that may be produced before the fuel unit is used and facilitate removal of contaminants from the hydrogen gas before it is released from the fuel unit.

It may be desirable to include thermal insulation near or as part of the package to protect the user when a used fuel unit is removed from the hydrogen generator. The package itself may be or include (e.g., as a layer thereof) a poor thermal conductor, or a layer of thermal insulation can be provided external or internal to the package. Examples of materials that may be suitable as thermal insulation include silica, silicon dioxide, silicon nitrides, silicon carbide, silica acrogel, calcium silicate, foamed silicone, alumina, aluminum oxide, glass, glass wool, mineral wool, cellular glass, perlite, and elastomers and polymers such as polyimides and epoxy-amine composites.

It may be desirable to include thermal conductors within the fuel unit to provide good heat transfer to remote portions of the fuel composition (portions that are not close to the package or to the heaters). As described above, additives may be included in the fuel composition for this purpose, or thermally conductive components can be included within the fuel unit. Heating efficiency can also be enhanced by applying heat to a recessed portion of the fuel unit package, such as a hollow core of the fuel unit, rather than to an outer surface (e.g., an outside diameter) of the fuel unit because heating from the inside of the fuel unit will result in less parasitic heat loss than heating from the outside of the fuel unit.

Fuel units can be used in a hydrogen generator in which the fuel composition in a fuel unit is heated to produce hydrogen gas. The hydrogen gas can be used by a hydrogen consuming apparatus, such as a hydrogen fuel cell battery. The hydrogen generator can include a housing, one or more heater assemblies, each configured to heat a portion of the fuel composition in the fuel unit(s) to at least a minimum temperature, electric circuitry for supplying electric current from an energy source to the heater(s), and one or more fuel units, which are removably inserted into the one or more cavities.

Preferably the hydrogen generator is portable, either alone or as part of a hydrogen consuming apparatus, such as part of a fuel cell system including a fuel cell battery or contained within a portable device that can be powered by a fuel cell system. As used herein, portable means readily moved by an individual person, without requiring the use of lifting or transporting equipment (e.g., a hoist, dolly, lift truck or the like).

In order to provide an economical hydrogen generator, it is desirable to be able to replace spent fuel composition (e.g., reaction byproducts) with fresh fuel composition, rather than replacing the entire hydrogen generator. This allows durable components of the hydrogen generator to be used many times. To maximize this effect, it is desirable to incorporate as many reusable components as practical into the reusable portion of the hydrogen generator (referred to below as the holder), the rest of the fuel cell system and/or the device associated with the fuel cell system, and to limit the number of components in the replaceable portion of the hydrogen generator (referred to below as the fuel unit) to the greatest extent practical. This is particularly true for such items that occupy a relatively large volume and/or are relatively expensive. Ideally, fuel units would contain only the hydrogen containing materials and minimal packaging. However, for practical reasons it may also be desirable to include other ingredients and components in the fuel units.

The hydrogen generator can include a holder that is configured to receive one or more fuel units. It can contain at least some of the other components of the hydrogen generator. In some circumstances, it may be desirable to locate at least portions of other components outside the holder, such as elsewhere within the hydrogen generator, the fuel cell system and/or device. The holder can include a housing of its own, particularly if the holder is intended to be removed from or used while outside the rest of the fuel cell system or device. A separate holder housing may not be desired if the hydrogen generator is contained within the fuel cell system and/or device. For example, a portion of the fuel cell system or device can serve as all or part of a holder housing. The holder housing has sufficient mechanical strength and resistance to the environment to which the hydrogen generator is expected to be exposed, particularly to high temperatures and hydrogen containing materials and byproducts associated with the release of hydrogen gas. Metals such as aluminum, steel and stainless steel, ceramics, and high temperature resistant polymers such as polyphenylene sulfide, acrylonitrile butadiene styrene, polyetheretherketone, polyetherimide, polyoxybenzylmethylenglycol anhydride (Bakelite®), epoxies, phenolics, diallyl phthalate and melamine may be suitable for the housing. In some embodiments the holder may be made from a material that is a poor thermal conductor (e.g., less than 10 watts/meter·Kelvin), and preferably less than 1 watt/meter·Kelvin) to protect the rest of the fuel cell system, the device and/or the user from heat produced within the hydrogen generator. If desired, thermal insulation can be added to the hydrogen generator, within the housing, around the housing or elsewhere in the fuel cell system or the device. A vacuum, such as in a hollow space in a wall(s) of the holder, can provide thermal insulation. Thermal insulation can protect components of the hydrogen generator, other parts of the fuel cell system, the device with which the fuel cell system is being used, and/or the user.

The hydrogen generator includes one or more cavities into which one or more fuel units can be removably inserted. The hydrogen generator can include features for aligning the fuel unit(s) in a particular orientation, providing thermal and/or electrical contact with the fuel unit, and/or providing a hydrogen gas flow path between the holder and the fuel unit. For example, walls defining the cavity can include one or more projections that cooperate with features of the fuel unit to permit insertion of a fuel unit into the cavity in only the desired orientation, projections can provide electrical and/or thermal contact with the fuel unit, or one or more projections can extend into a recessed area of the fuel unit to provide heating from the inside of the fuel unit outward. The hydrogen generator can be closable to retain the fuel unit within the cavity, and it may be sealable to exclude gases from the outside environment and to contain pressurized hydrogen gas. If internal pressure can build up during operation of the hydrogen generator, it may be desirable to include a pressure relief vent to release gas before the pressure becomes excessive (i.e., to prevent undesired opening or bursting of the housing).

The hydrogen generator can include one or more heater assemblies. The heater assemblies can be disposed in the hydrogen generator in various ways. In one embodiment, a heater assembly may be secured to a structure of the housing, such as an exterior or interior wall. For example, the heater assembly may be secured to the rear wall or one or more sidewalls and/or to a front panel that provides access for a user to insert and remove fuel units. In another example, a heater assembly may be secured to an interior wall (e.g., a partition) extending inward from an exterior wall. In another embodiment, an exterior or interior wall of the housing can be a heater assembly, thereby reducing the number of components in the hydrogen generator. When the heater assembly is secured to or is a part of an interior wall, heaters can be provided on one or more surfaces such that the heaters can heat from the inside toward the outside of the adjacent fuel unit(s), which can provide more efficient heating, with minimal heat loss. In one such embodiment, the heater assembly support member is at least part of an internal wall of the housing and has heaters secured on opposite surfaces of the support member, with the heater assembly disposed between fuel units on opposite sides thereof or disposed within a cavity in a fuel unit when the fuel unit(s) are disposed in the hydrogen generator. Preferably, the heater assembly is configured for permanent positioning within the cavity. The heater assembly may also include a fastening mechanism that enables the heater assembly to be removed, at times, for maintenance, for example. The heater assembly may use any desired fastening mechanism to secure the heater assembly to the housing.

When in the extended state, the heater assembly will be in thermal contact with a thermally conductive section in the fuel unit such that heat produced by the heater is conducted to the contents of the fuel unit (e.g., through the fuel unit package). To provide good thermal contact, the heating surface of the extended heater assembly will fit snugly against the fuel unit.

Multiple heaters can be used to provide the capability of selectively heating limited quantities of the total amount of hydrogen containing material in one or more fuel units. This can be helpful in generating hydrogen gas on an as needed basis and minimizing response times during intermittent use, without creating excessive pressure within the hydrogen generator. For example, individual heaters can be associated with segregated quantities of fuel composition within a fuel unit, and operation of selected heaters can be controlled to initiate the release of hydrogen gas within only the desired quantities of fuel composition. This can require alignment of conductor sections in the fuel unit package with individual heaters or electrical contact terminals in the hydrogen generator outside the fuel unit. As an alternative, a heater can be moved within the cavity to align with selected conductor sections of the fuel unit package. This can provide controlled generation of hydrogen gas with fewer heaters, but adding volume and cost for the mechanism necessary to move the heater.

In order to provide hydrogen gas on an as-needed basis without developing a high internal pressure within the hydrogen generator, it may be advantageous for the hydrogen generator to include multiple fuel units, each of which that can be used selectively, and/or for the fuel unit(s) to contain multiple segregated quantities of fuel composition in which the release of hydrogen gas can be individually initiated on a selective basis. This can be accomplished by using a control system in conjunction with multiple heaters and/or a movable heater that can be located within or aligned with individual segregated quantities of fuel composition in the fuel unit(s).

A control system can be used to control the supply of energy from a source to the heater assembly. The control system can determine the need for hydrogen and/or the required hydrogen flow rate by monitoring the pressure within the hydrogen consuming (e.g., fuel cell) system, one or more electrical characteristics of the fuel cell battery, or one or more electrical characteristics of the electronic device, for example. The controller may communicate with the device or the fuel cell battery to determine when more hydrogen is needed. The control system can be completely or partially disposed in the hydrogen generator, the fuel cell battery, the electronic device being powered by the fuel cell battery, or any combination thereof. The control system can include a microprocessor or microcontroller; digital, analog and/or hybrid circuitry; solid state and/or electromechanical switching devices; capacitors, sensing instrumentation, timers and so on. The same or a different control system can also be used for other purposes, such as identifying hydrogen generators and fuel units that are appropriate or approved for use, preventing use of inappropriate or unapproved hydrogen generators and fuel units, controlling charging of batteries in the fuel cell system and the device by the fuel cell battery, calculating and providing information on the remaining capacity of the fuel unit(s), recording historical information regarding the use of fuel units, the hydrogen generator, the fuel cell system and the device, preventing operation of the hydrogen generator under unsafe conditions, and other purposes.

Hydrogen gas produced in the fuel unit exits the fuel unit and can then exit the hydrogen generator through a hydrogen flow path to an outlet that interfaces with the rest of the hydrogen consuming (e.g., fuel cell) system. The hydrogen generator can include various fittings, valves and electrical connections for providing hydrogen to and interfacing with a fuel cell battery and/or an electrical device being provided with power by the fuel cell system. It may be desirable to provide one or more filters or purification units (referred to as filters below) in the hydrogen flow path to remove solid or gaseous byproducts (such as fuel cell poisons) and/or unreacted fuel composition from the hydrogen gas. Filters can be located within the fuel units, within the holder and/or at the interface between the hydrogen generator and the rest of the fuel cell system. Filters within the fuel units are replaced when the fuel units are replaced. It may be desirable to provide access for periodically replacing filters located outside the fuel units. Examples of materials that may be suitable for filters include silica, silicon dioxide, silicon nitrides, silicon carbide, silica aerogel, alumina, aluminum oxide, glass, glass wool, mineral wool, cellular glass, microfiberglass, perlite and polymers such as polytetrafluoroethylenes, polyimides and epoxy-amine composites, as well as suitable gas purification units (such as ion exchange resins). It may be possible to position filters so they also provide thermal insulation.

In an embodiment of a hydrogen generator, an access panel can be secured to the housing to enclose the fuel unit(s) in the cavity with an interlock mechanism. The interlock mechanism retains the access panel in place when an internal temperature of the hydrogen generator exceeds a prescribed temperature but allows opening or removal of the access panel when the temperature is at or below the prescribed internal temperature. The interlock mechanism can thus prevent removal of a fuel unit from the hydrogen generator while the fuel unit is hot enough to cause personal injury to a user or damage to materials with which it may subsequently come in contact.

FIG. 1 shows two exemplary packaged fuel units 60, one of which is shown exploded so internal components are visible. The fuel units 60 are positioned with packaging strips 46 facing each other. Each packaging strip 46 includes a substrate 10 with apertures 12 covered by conductor sections 22. Each of the fuel units 60 is shown in FIG. 1 with external thermal insulation 62 surrounding all sides except the sides covered by the package strips 46. In some embodiments the fuel units 60 can be connected to each other, such as along one edge. They can be interconnected by one or any combination of their containers 52, package strips 46, external thermal insulation 62, or some other component (not shown). If the fuel units 60 are interconnected, they can be spaced apart, and if the interconnection is at least somewhat rigid, spacing can be maintained between the fuel units 60, such as to accommodate a heater assembly between the fuel units 60. The fuel unit 60 can include a hydrogen gas outlet 66 and a filter 64 between the quantities of fuel composition 54 in a plurality of compartments 56 and an outlet 66 (e.g., by attaching a filter membrane to the outlet 66 or the container 52).

Figure 2A:
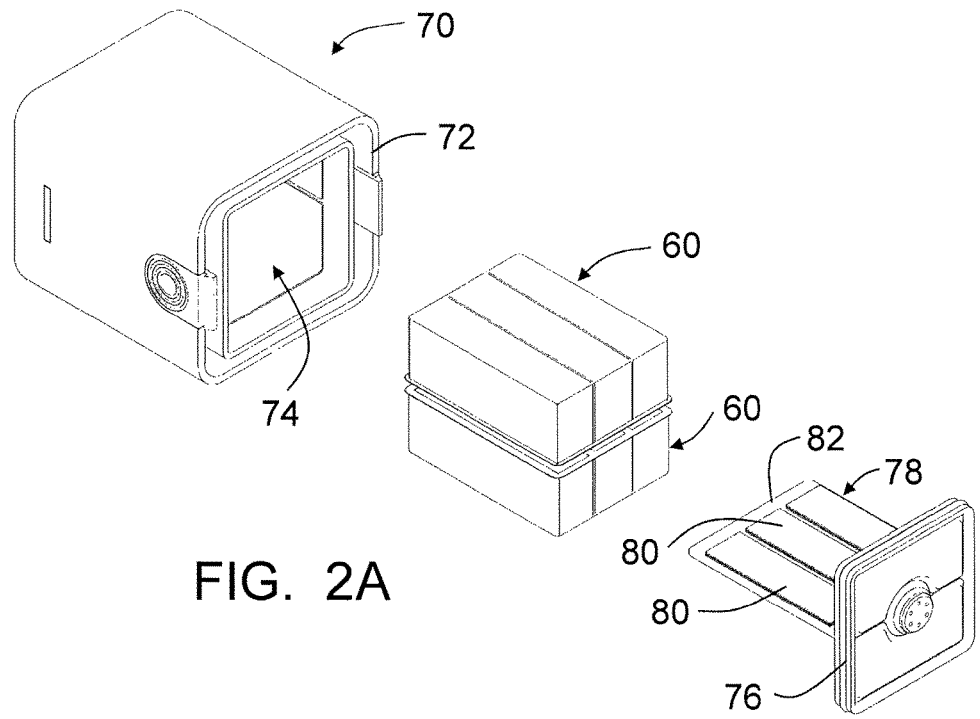
FIG. 2A is a perspective view of an embodiment of a hydrogen generator and fuel units for insertion therein.
Figure 2B:
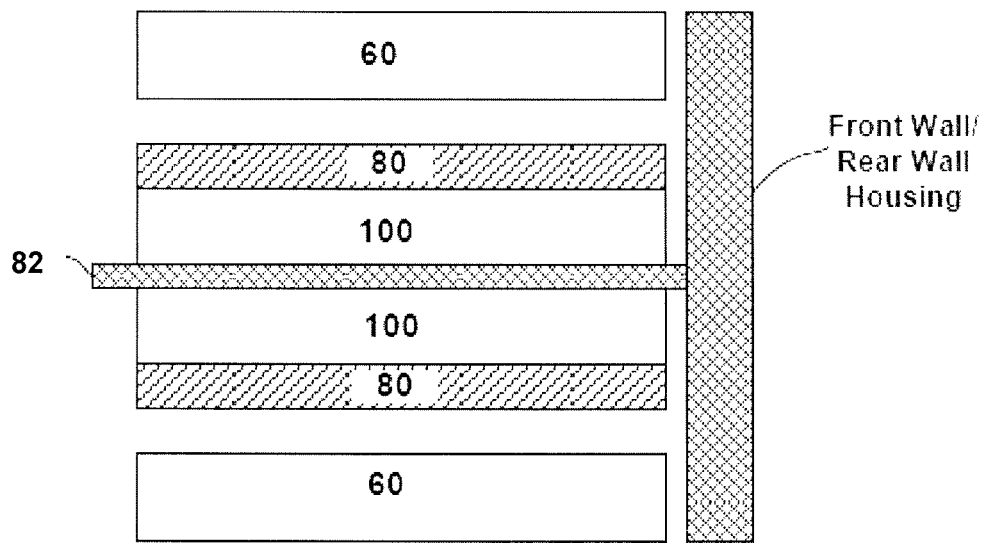
FIGS. 2B and 2C are cross-section views of the embodiment illustrated in FIG. 2A.
Figure 2C:
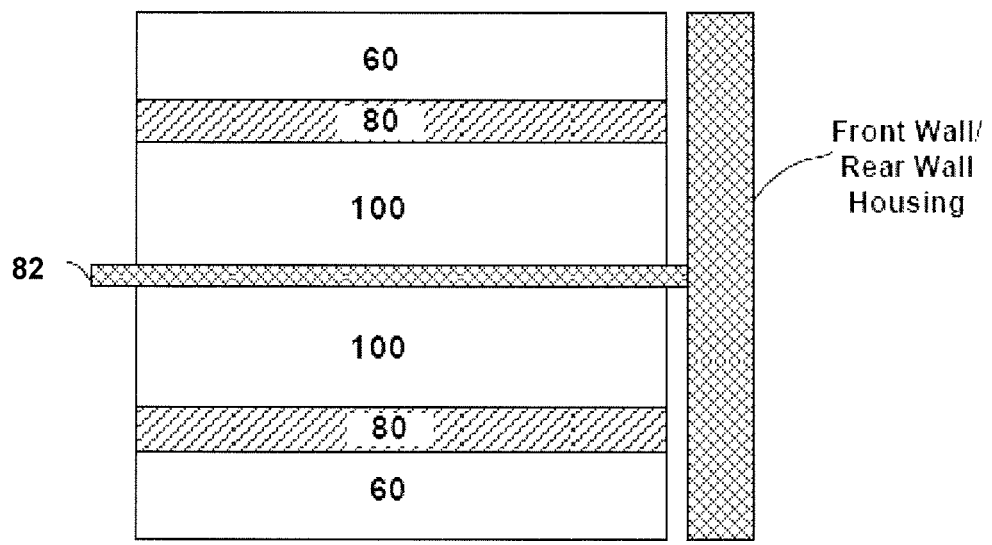

An embodiment of a hydrogen generator is shown in FIGS. 2A-2C. The hydrogen generator 70 includes a housing 72, with a cavity 74 into which packaged fuel units 60 can be inserted. The hydrogen generator 70 includes a door 76 for closing and sealing the housing 72 with the fuel units 60 inside. Two rectangular fuel units 60, each containing three segregated quantities of fuel composition 54, are shown, but fewer or more fuel units with the same or different shapes and the same or a different number of quantities of fuel composition 54 can be used. The hydrogen generator 70 further includes at least one heater assembly 78 with one or more heaters 80 and actuators 100 (see FIGS. 2B, 2C) supported by a support member 82. The heaters 80 may be coupled to the support member 82 by one or more actuators 100. The actuators 100 are preferably one or more thermal actuators (e.g., a bimetallic element) that are in a first retracted state when the actuator temperature is below a first prescribed temperature and in a second extended state when the actuator temperature is above a second prescribed temperature. Referring to FIG. 2B, the actuator 100 is illustrated in the retracted state. In the retracted state, the heater assembly 78, along with the heaters 80 and the actuators 100, is configured to be received between the rectangular fuel units 60. Referring to FIG. 2C, the actuator 100 is illustrated in the extended state. In the extended state, the actuator temperature is above a second prescribed temperature and the actuator 100 forces the heaters 80 to make contact with the fuel units 60. Preferably, the heaters 80 will make contact with corresponding conductor sections 22 when the fuel units 60 are disposed in the cavity 74 and the actuators 100 are in the extended state.

Figure 3A:
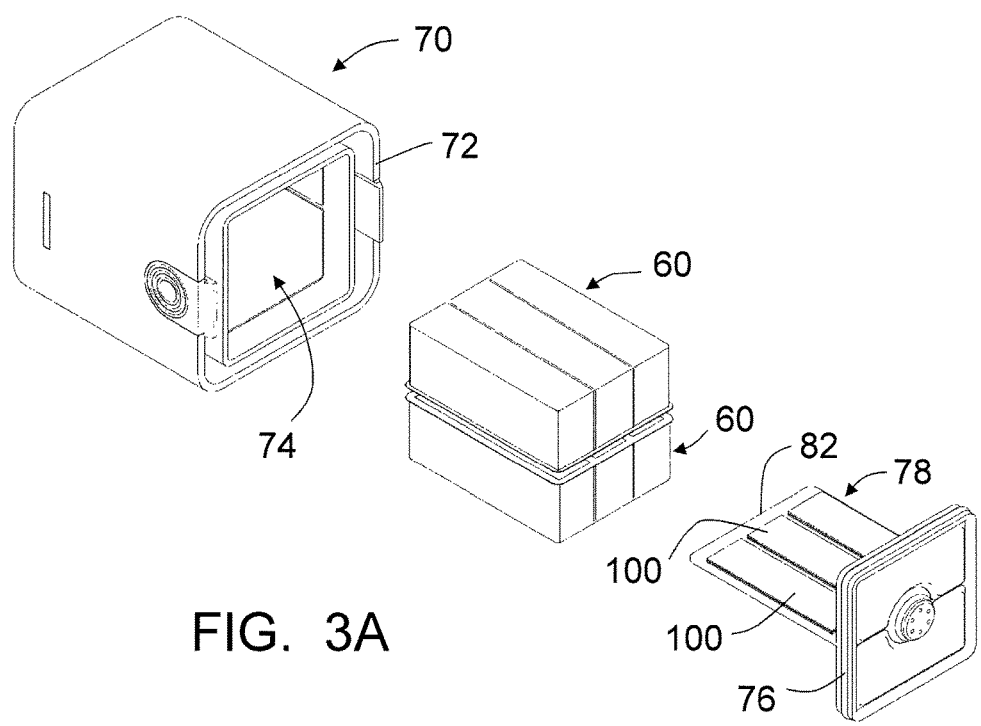
FIG. 3A is a perspective view of an embodiment of a hydrogen generator and fuel units for insertion therein.
Figure 3B:
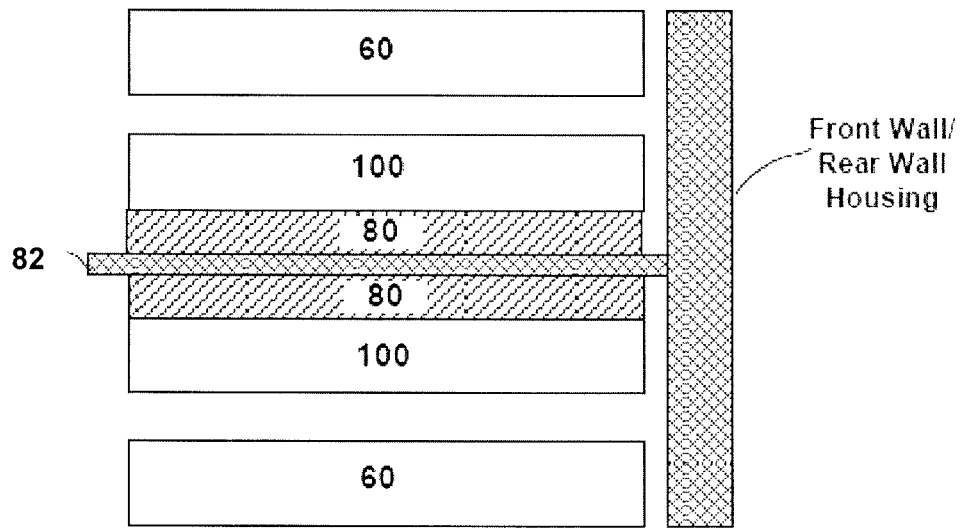
FIGS. 3B and 3C are cross-section views of the embodiment illustrated in FIG. 3A.
Figure 3C:
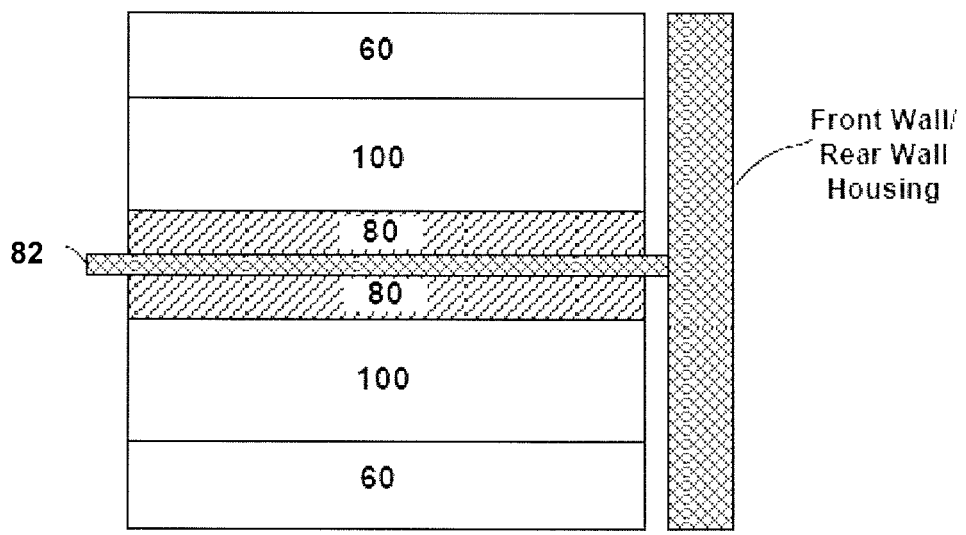

Another embodiment of a hydrogen generator is shown in FIGS. 3A-3C. The hydrogen generator 70 of FIGS. 3A-3C is identical to the hydrogen generator of FIGS. 2A-2C, except that the heaters 80 are coupled to a support member 82. One or more actuators 100 may then be coupled to the support member 82 as illustrated in FIGS. 3A-3C. Referring to FIG. 3B, the actuators 100 are illustrated in the retracted state. In the retracted state, the heater assembly 78, including the heaters 80 and the actuators 100, is configured to be received between the fuel units 60. Referring to FIG. 3C, the actuator 100 is illustrated in the extended state. In the extended state, the actuator temperature is above a second prescribed temperature. Thermal energy is transferred from the heaters 80 and through the actuators 100, which are in contact with the fuel unit 60. Preferably, the actuators 100 will make contact with corresponding conductor sections 22 when the fuel units 60 are disposed in the cavity 74 and the actuators 100 are in the extended state.

Figure 4A:
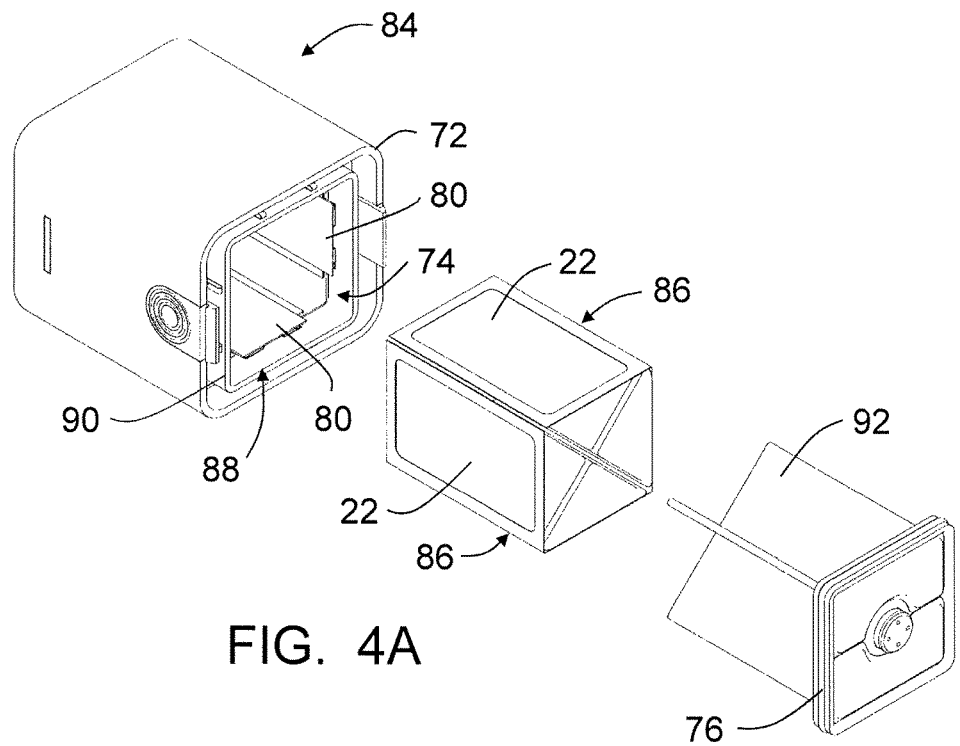
FIG. 4A is a perspective view of an embodiment of a hydrogen generator and fuel units for insertion therein.
Figure 5A:
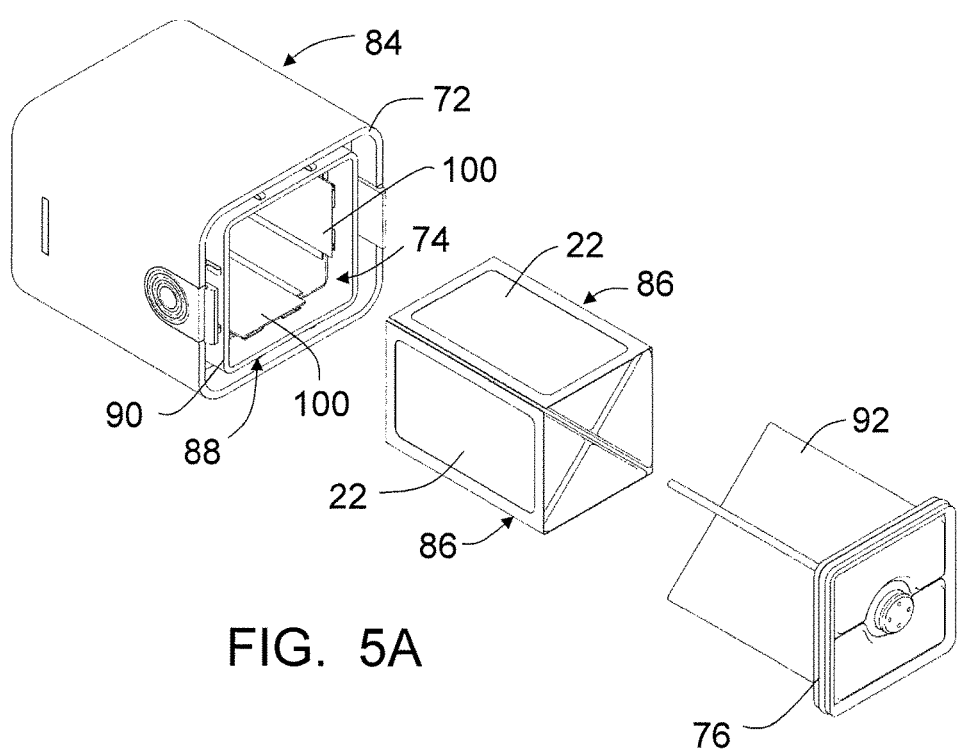
FIG. 5A is a perspective view of an embodiment of a hydrogen generator and fuel units for insertion therein.
Figure 4B:
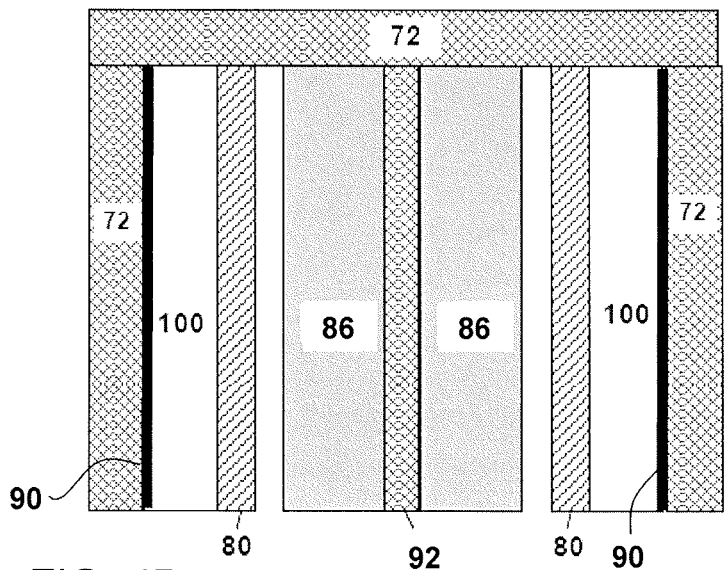
FIGS. 4B and 4C are cross-section views of the embodiment illustrated in FIG. 2A.
Figure 4C:
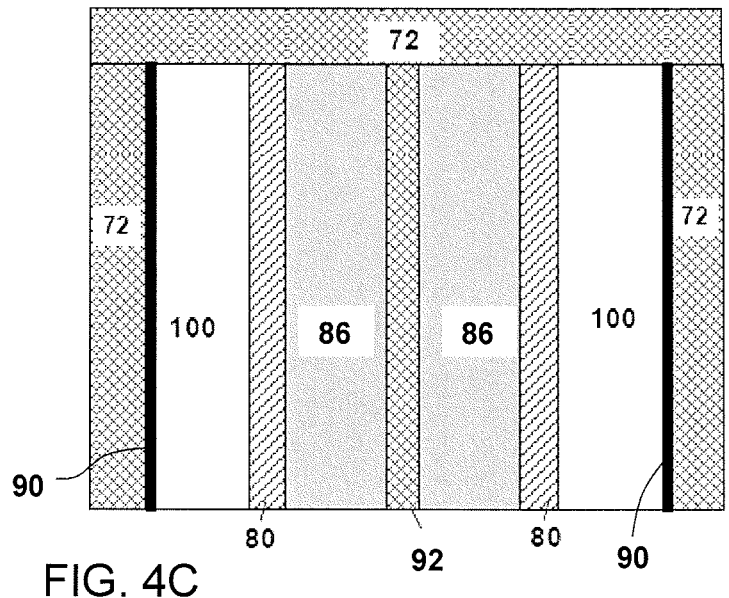
Figure 5B:
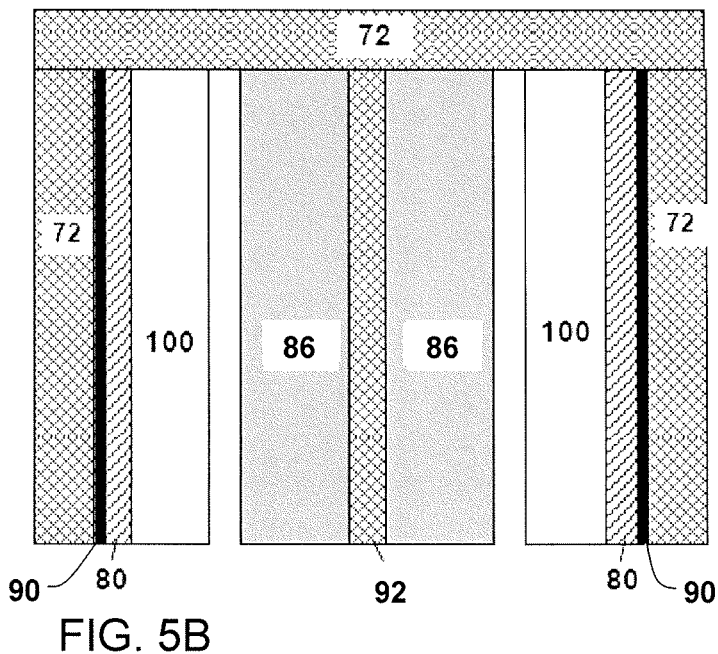
FIGS. 5B and 5C are cross-section views of the embodiment illustrated in FIG. 5A.
Figure 5C:
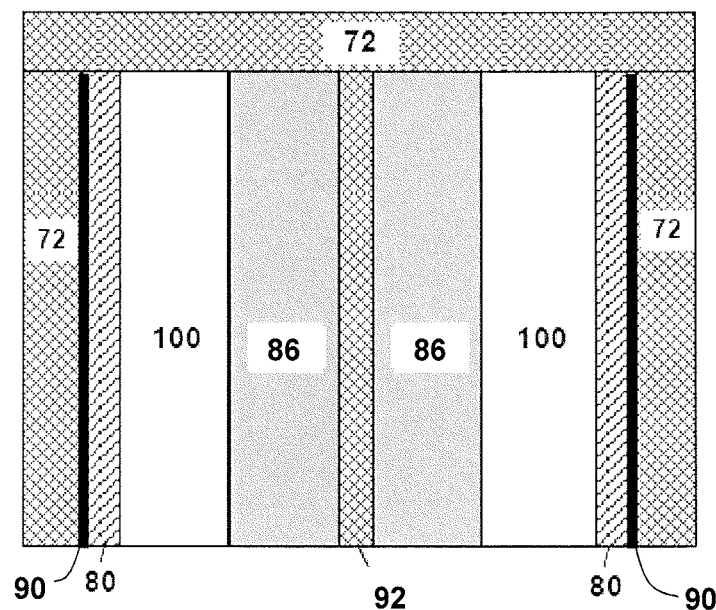
Figure 6:
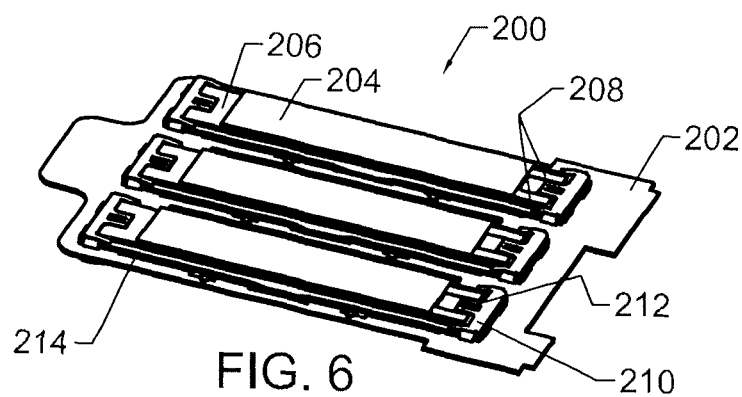
FIG. 6 is a perspective view of a heater assembly with actuators retracted.
Figure 7:
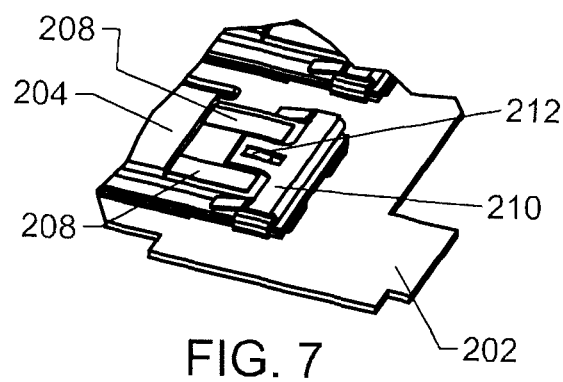
FIG. 7 is an enlarged view of a portion of the heater assembly illustrated in FIG. 6.

In another embodiment, illustrated in FIGS. 4A and 5A, the heater assembly 88 includes heaters 80 that can be attached to the housing 72 (e.g., a sidewall, rear wall, etc.) and optionally an intermediate support member 92 through an actuator 100 (as illustrated in FIGS. 4A-4C), or the heater assembly 88 can be attached to the housing 72 and further include an actuator 100 coupled to the support member 92 (as illustrated in FIGS. 5A-5C). When the heater assembly 88 is attached to the side walls or rear wall of the housing 72, as shown in FIGS. 4A and 5A, it may be desirable for support member 92 to be a thermal insulation member, projecting inward from the door 76 to provide thermal separation between the fuel units 86.

Referring to FIGS. 4A-4C, the hydrogen generator 84 further includes at least one heater assembly with one or more heaters 80 each. The heaters 80 may be coupled to the support member 90 or housing 72 by one or more actuators 100. The actuator 100 is preferably a thermal actuator (e.g., a bimetallic element) that is in a retracted state when the actuator temperature is below a first prescribed temperature and in an extended state when the actuator temperature is above a second prescribed temperature. When the actuator temperature is in the retracted state, the fuel units 86 may be easily inserted and/or removed from the cavity 74. When the actuator temperature is above the second prescribed temperature, the actuator 100 is in the extended state and forces the heater 80 to contact the fuel unit 86.

Referring to FIG. 4B, the actuators 100 are illustrated in the retracted state. In the retracted state, the heater assembly 88, including the heaters 80 and the actuators 100, is configured allow easy insertion and/or removal of the fuel units 86 within the cavity 74. Referring to FIG. 4C, the actuators 100 are illustrated in the extended state. In the extended state, the actuator temperature is above a prescribed second temperature and the actuators 100 force the heaters 80 to make contact with the fuel units 86. Preferably, the heaters 80 will make contact with corresponding conductor sections 22 when the fuel units 86 are disposed in the cavity 74 and the actuators 100 are in the extended state.

Another embodiment of a hydrogen generator is shown in FIGS. 5A-5C. The hydrogen generator 84 of FIGS. 5A-5C is identical to the hydrogen generator 84 of FIGS. 4A-4C, except that the heaters 80 may be coupled to the housing 72 (e.g., a sidewall, rear wall, etc.) or optionally to an intermediate support member 90. One more actuators 100 may be coupled to heaters 80, such that the one or more actuators 100 can transfer thermal energy emitted by the heaters 80 to the one or more fuel units 86. The actuators 100 are preferably thermal actuators (e.g., bimetallic elements) that are in a retracted state when the actuator temperature is below a first prescribed temperature and in an extended state when the actuator temperature is above a second prescribed temperature. When the actuator temperature is below the first prescribed temperature, the fuel units 86 may be easily inserted and/or removed from the cavity 74. When the actuator temperature is above the second prescribed temperature, the actuator 100 is extended and makes contact with the fuel unit 86. Preferably, the actuators 100 will make contact with corresponding conductor sections 22 when the fuel units 86 are inserted in the cavity 74 and the actuators 100 are in the second state.

Referring to FIG. 5B, the actuators 100 are illustrated in the retracted state. In the retracted state, the heater assembly 88, including the heaters 80 and the actuators 100, is configured to allow easy insertion and/or removal of the fuel units 86 within the cavity 74. Referring to FIG. 5C, each actuator 100 is illustrated in the extended state. In the extended state, the actuator temperature is above a second prescribed temperature and the actuator 100 makes contact with the fuel unit 86. Preferably, the actuator 100 will make contact with corresponding conductor sections 22 when the fuel unit 86 is disposed in the cavity 74 and the actuator 100 is in the extended state.

The heater assemblies 88 can be on an inner surface of the door 76 or an inner surface of the housing 72 (e.g., the side walls and/or rear wall), such that the heaters 80 or the actuators 100 will make contact with corresponding conductor sections 22 when the fuel units 86 are inserted in the cavity 74 and the actuators 100 are in the second state. Alternatively, the heater assemblies 88 can be on a support member 92 extending from the door 76 (as shown in FIG. 2A) or from the housing 72, such that heaters 80 or the actuators 100 will make contact with corresponding conductor sections 22 when the fuel unit(s) 86 are inserted in the cavity 74 and the temperature is above the first prescribed threshold. By centrally locating the heater assembly 78, the fuel units 86 are substantially heated from the inside out.

In the embodiments illustrated in FIGS. 4A-4C and 5A-5C, the hydrogen generator 84 includes a housing 72, with a cavity 74 into which packaged fuel units 86 can be inserted. The hydrogen generator 84 includes a door 76 for closing and sealing the housing 72 with the fuel units 86 inside. Four triangular fuel units 86 with one quantity of fuel composition 54 each are shown. Different shapes and numbers of fuel units with different numbers of quantities of fuel composition can be used. As discussed above, the hydrogen generator 84 includes at least one heater assembly 88 with one or more heaters 80 and one or more actuators 100. The heater assembly 88 can be attached to the door 76, as shown in FIG. 3, or to the housing 72. Heating assemblies 88 can be on an inner surface of the housing 72 (as shown) or door 76, such that the heaters 80 will make contact with corresponding conductor sections 22 when the fuel units 86 are inserted in the cavity 74. Alternatively, the heater assemblies 88 can be on a support member 82 extending from the door 76 (as shown) or from the housing 72, such that heaters 80 will make contact with corresponding conductor sections 22 when the fuel units 86 are inserted in the cavity 74.

An embodiment of a heater assembly for a hydrogen generator is illustrated in FIGS. 6 to 9. Heater assembly 200 includes a support member 202, which can be secured to a portion of a hydrogen generator housing, such as a housing wall or a door. Heaters 204 are each mounted onto a heater substrate 206, and the heaters and substrates are secured to an actuator 214, such as with retainers 210 with clips 212. The actuators 214 are secured to the heaters 204 and substrates 206 in such a way that the ends of the actuator 214 are movably held by the retainers 210, allowing the ends of the actuator 210 to slide slightly with respect to the heaters 204 and substrates 206 as the actuator moves in response to heating and cooling.

Figure 10A:
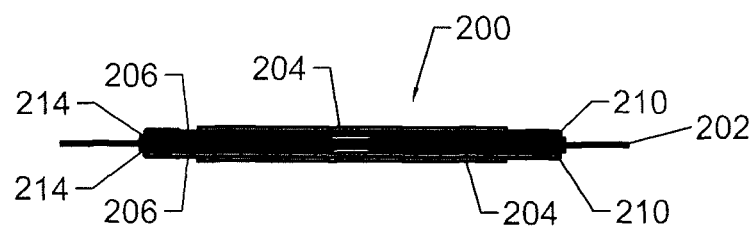
FIG. 10A is a cross-section view of the heater assembly illustrated in FIG. 9, taken through A-A.
Figure 10B:
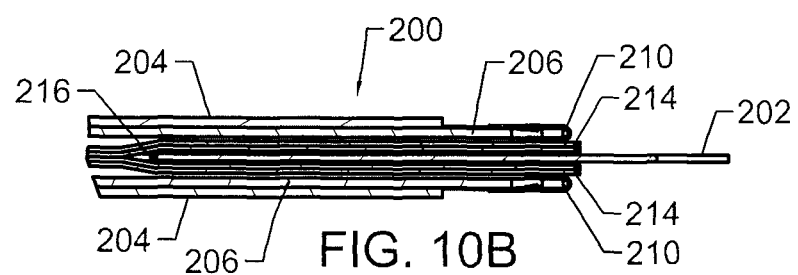
FIG. 10B is an enlarged view of a portion of the heater assembly illustrated in FIG. 10A.

The actuators 214 can be secured to the support member 202 (e.g., in embodiments in which heaters are disposed on only one surface of the support member), or, as shown in FIGS. 10A and 10B, when heaters 204 are disposed on opposite surfaces of the support member 202, actuators 214 on opposite sides of the support member 202 can be secured together (e.g., by spot welding) through an aperture 220 in the support member. To minimize heat transfer between actuators 214 on opposite sides of the support member 202, insulators 216 can be disposed between the actuators 214 and the support member 202. Edges of the insulators 216 extending beyond the corresponding edges of the actuators 214 can be secured to the support member 202 to hold the insulators 216 in place as the actuators 214 retract and extend.

Figure 8:
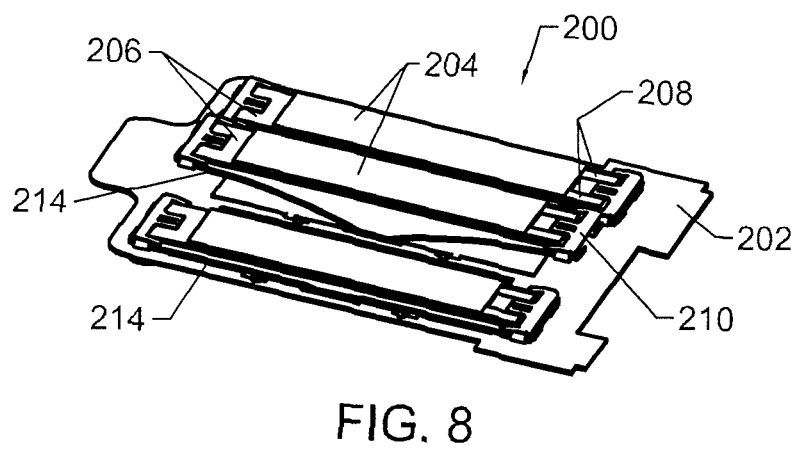
FIG. 8 is a perspective view of the heater assembly illustrated in FIG. 6 with one actuator extended.
Figure 9:
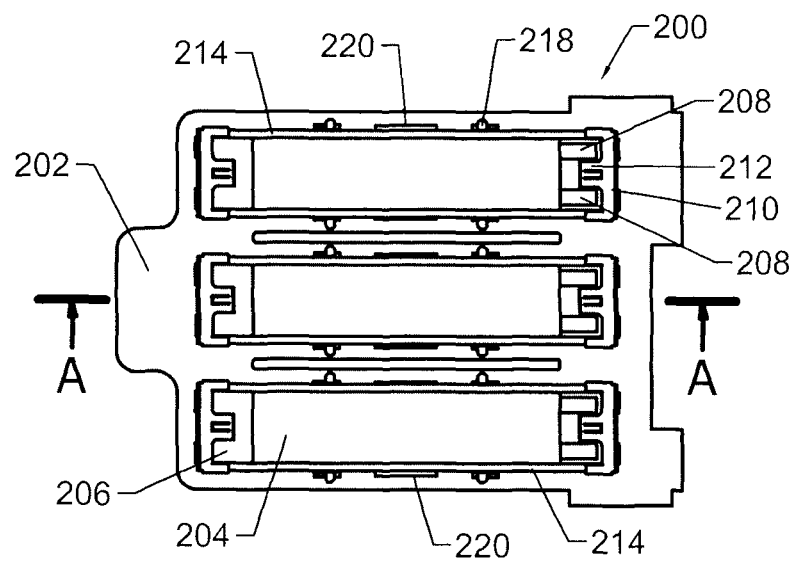
FIG. 9 is a plan view of the heater assembly illustrated in FIG. 6.
Figure 11A:
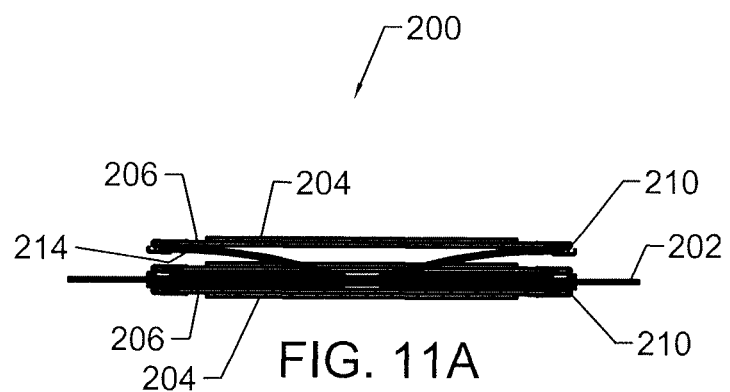
FIG. 11A is a cross-section view of the heater assembly illustrated in FIG. 8.
Figure 11B:
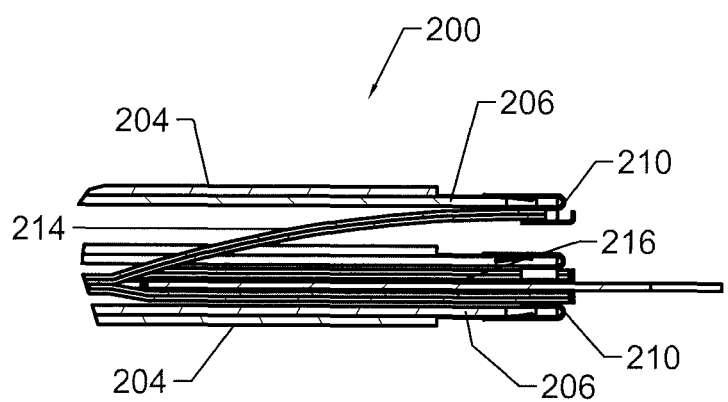
FIG. 11B is an enlarged view of a portion of the heater assembly illustrated in FIG. 11A.

In FIGS. 6, 7, 9, 10A and 10B, the actuators 214 are shown in a retracted position, with the heaters 204 and substrates 206 pulled close to the support member 202. FIG. 8 shows heater assembly 200 with one of the actuators 214 extended, to displace the corresponding heater 204 and substrate 206 away form the support member 202. FIG. 11A is a cross sectional view of the heater assembly in FIG. 8, taken along the length of the extended heater 204 and substrate 206, and FIG. 11B is an enlarged view of a portion of FIG. 11A.

In use in a hydrogen generator, the heater assembly 200 is fully retracted when cool, so one or more fuel units can be inserted into or removed from the hydrogen generator without being contacted by the heater assembly 200. When the fuel unit is in place in the hydrogen generator, one or more heaters 204 can be selectively energized through electrical contacts 208. As a heater 204 gets hot, it heats the corresponding actuator 214, and when the actuator 214 reaches the required temperature, the actuator 214 extends, pushing the heater 214 against the fuel unit, heating a portion of the fuel unit. When it is no longer necessary to heat that portion of the fuel unit, the heater 204 is de-energized, allowing it and the corresponding actuator 214 to cool. When the temperature of the actuator 214 drops to a low enough temperature, the actuator retracts, retracting with it the corresponding heater 204, so the heater 204 is no longer in contact with the fuel unit.

All references cited herein are expressly incorporated herein by reference in their entireties. To the extent publications and patents or patent applications incorporated by reference contradict the disclosure contained in the present specification, the present specification is intended to supersede and/or take precedence over any such contradictory material.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

The invention claimed is:

1. A hydrogen generator comprising:
    a fuel unit;
    at least one heater in a heater assembly;
    an actuator connected to each heater;
    a support member, with the at least one heater coupled to the support member by the actuator;
    the actuator and the heater assembly are in a retracted state when the actuator is at or below a first prescribed temperature and in an extended state when the actuator is at or above a higher second prescribed temperature; and, a heating surface of the heater assembly is disposed closer to the support member when the heater assembly is in the retracted state than when the heater assembly is in the extended state;
    when in the extended state the heater is in thermal contact with the fuel unit; and
    wherein the heater assembly further comprises a retainer that moveably secures the actuator to one of the heater and the support member such that an end of the actuator is movable within the retainer,
    wherein the actuator has opposite ends, and each of the opposite ends of the actuator is movably secured to the heater or the support member by one or more retainers.

2. The hydrogen generator according to claim 1, wherein an actuator is movable from the retracted state to the extended state when an actuator temperature increases to at least the second prescribed temperature, and the actuator is movable from the extended state to the retracted state when an actuator temperature decreases to or below the first prescribed temperature.

3. The hydrogen generator according to claim 1, wherein the heater assembly comprises a plurality of the actuators and a plurality of the heaters.

4. The hydrogen generator according to claim 1, wherein the heater comprises a heating element disposed on a heater substrate.

5. The hydrogen generator according to claim 1, wherein the end of the actuator is slidable within the retainer.

6. The hydrogen generator according to claim 1, wherein the actuator is secured between opposite ends to the support member.

7. The hydrogen generator according to claim 1, wherein the heater assembly comprises two actuators, each disposed on an opposite side of the support member, and each of the actuators is secured between opposite ends to the other actuator, through an aperture in the support member.

8. The hydrogen generator according to claim 1, wherein the heater assembly comprises a thermally conductive plate that includes the heating surface.

9. The hydrogen generator according to claim 1, wherein the actuator is disposed on a first side of the heater with the thermally conductive plate disposed on an opposite second side of the heater.

10. The hydrogen generator according to claim 1, wherein the support member is disposed on a first side of the heater with the actuator disposed on an opposite second side of the heater, between the heater and the thermally conductive plate.

11. The hydrogen generator according to claim 10, wherein the thermally conductive plate comprises an integral retainer that movably secures the end of the actuator to the heater.

12. A hydrogen generator comprising:
    a housing, a replaceable fuel cartridge containing a hydrogen containing material, and a heater assembly for heating the hydrogen containing material to release hydrogen gas; wherein:
    the heater assembly comprises a support member, a heater, an actuator for extending and retracting a heater assembly heating surface away from and toward the support member, respectively; and
    when the heater assembly actuator is in an extended state the heating surface is in contact with the replaceable fuel cartridge unit, and when the actuator is in the retracted state a gap is present between the heating surface and the replaceable fuel cartridge;
    wherein the heater assembly further comprises a retainer that moveably secures the actuator to one of the heater and the support member such that an end of the actuator is movable within the retainer,
    wherein the actuator has opposite ends, and each of the opposite ends of the actuator is movably secured to the heater or the support member by one or more retainers.

13. The hydrogen generator according to claim 12, wherein the end of the actuator is slidable within the retainer.

14. The hydrogen generator according to claim 12, wherein the actuator is secured between opposite ends to the support member.

15. The hydrogen generator according to claim 12, wherein the heater assembly comprises two actuators, each disposed on an opposite side of the support member, and each of the actuators is secured between opposite ends to the other actuator, through an aperture in the support member.

* * * * *